United States Patent
Snook

(10) Patent No.: US 6,601,539 B1
(45) Date of Patent: Aug. 5, 2003

(54) VEGETABLE BASED ANIMAL CHEW AND ANIMAL CHEW TOY AND METHOD FOR MAKING THE SAME

(76) Inventor: Patrice Michelle Snook, 22641 S. Day Hill Rd., Estacada, OR (US) 97023

( * ) Notice: Subject to any disclaimer, the term of this patent is extended or adjusted under 35 U.S.C. 154(b) by 0 days.

(21) Appl. No.: 10/123,595

(22) Filed: Apr. 16, 2002

Related U.S. Application Data

(60) Provisional application No. 60/305,844, filed on Jul. 17, 2001.

(51) Int. Cl.[7] .............................................. A01K 29/00
(52) U.S. Cl. ...................................................... 119/710
(58) Field of Search ................................ 119/707, 708, 119/709, 710, 711

(56) References Cited

U.S. PATENT DOCUMENTS

| | | | | |
|---|---|---|---|---|
| 1,565,077 A | * | 12/1925 | Finn | 206/525 |
| 4,542,714 A | * | 9/1985 | Ingraham et al. | 119/531 |
| 5,022,345 A | * | 6/1991 | Bolivar et al. | 119/531 |
| 5,193,443 A | * | 3/1993 | Carney | 211/125 |
| 5,827,565 A | | 10/1998 | Axelrod | |
| 5,941,197 A | | 8/1999 | Axelrod | |
| 6,093,427 A | | 7/2000 | Axelrod | |
| 6,129,053 A | * | 10/2000 | Markham et al. | 119/710 |
| 6,158,391 A | * | 12/2000 | Simonetti | 119/702 |
| 6,200,616 B1 | | 3/2001 | Axelrod | |
| 6,274,182 B1 | | 8/2001 | Axelrod et al. | |

* cited by examiner

*Primary Examiner*—Charles T. Jordan
*Assistant Examiner*—Jordan M Lofdahl
(74) *Attorney, Agent, or Firm*—Robert K. Lau

(57) ABSTRACT

An animal chew product that provides oral hygiene benefits, comprising portions of dehydrated sweet potatoes or yams or both. In addition, the process for using and making said animal chew product.

20 Claims, 2 Drawing Sheets

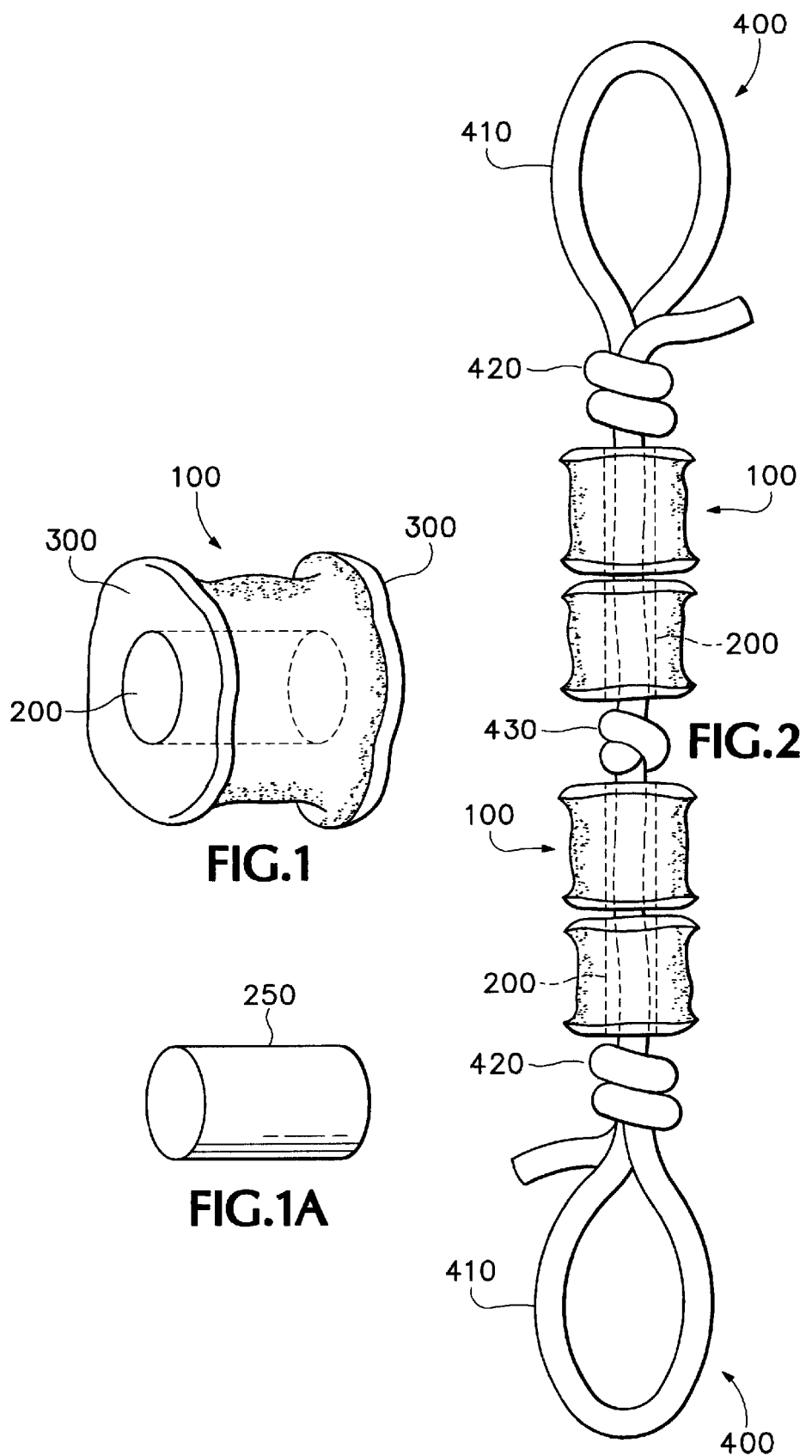

VEGETABLE BASED ANIMAL CHEW AND ANIMAL CHEW TOY AND METHOD FOR MAKING THE SAME

CROSS-REFERENCE TO RELATED APPLICATIONS

This application claims the benefit of U.S. Provisional Application No. 60/305,844, filed Jul. 17, 2001.

BACKGROUND OF THE INVENTION

1. Field of the Invention

The invention relates to an animal chew product comprising of dehydrated sweet potatoes and yams, and methods for using and making the same.

2. Description of Prior Art

It is well known that animals benefit from chewing bones and other hard objects. Dogs chew on bones for jaw exercise and teeth cleaning. Rabbits and rodents chew on hard objects to clean and trim their teeth. Birds peck on hard objects to strengthen and maintain proper beak size.

Accordingly, many animal chew products are available and are made from a variety of materials. For example, many chew products for use with dogs are made from animal-derived materials such as pigs ears, beef jerky, smoked hooves, pigs skins, and cattle rawhide. In addition, there are a large number of animal chew products made from synthetic materials, such as rubber or nylon, and from non synthetic materials.

The prior art animal products have several drawbacks. The chew products that are derived from animal materials have presented health problems for both animals and humans. These products have posed risk of bacterial infection such as Salmonella infantis and other diseases. Humans who handle such products may become infected and suffer life threatening injury.

Although sanitized animal-derived chew products and chew products made from synthetic material do not present the foregoing bacterial health risk, they nevertheless can cause significant injury to the animal. Many indigestible objects are given to animals to chew and although the animals may enjoy chewing on these items, the objects are often swallowed in whole or part. Once swallowed, these objects or their fragments can adversely affect the animal's digestive tract causing discomfort and possible life-threatening injury.. For example pieces of rawhide can become lodged in an animal's throat causing choking. Also, frequent ingestion of rawhide can cause gastric irritation resulting in vomiting. Indigestible synthetic chews and undigested rawhide can become lodged in the animal's digestive passages and interfere with the normal digestion of food and elimination of waste. Consequently, the lodged materials must be removed surgically.

As a response to sector of the above issues, digestible dog chew products have been developed. These digestible chew products may be composed of synthetic digestive fiber, highly processed and refined vegetable-based matter, granulated starch. casein, or a combination of any of the foregoing. Such chew products are disclosed in the following U.S. Pat. Nos.: 6,274,182; 6,200,616; 6,093,427; 5,941,197; and 5,827,565. The foregoing patents disclose chew products made of the foregoing materials and methods making these products. The methods all use a raised temperature injection molding apparatus to form shapes that a canine would masticate. These digestible chews, however, contain substantial amounts of non-nutritive materials and require favoring and nutritional supplementation.

While all of the above chew products, animal-derived, synthetic, and digestible, may provide jaw exercise and teeth cleaning benefits, they lack fiber, may result in health concerns to animals and humans, or are not inherently nutritious. Furthermore, more and more animal owners prefer to provide all-natural products to their animals. Therefore, a need exists for a new animal chew product that provides nutrition without the use of additives or nutritional supplements, is easily digestible, aids in dental health, and is safe to both animals and humans and methods for making the same.

BRIEF SUMMARY OF THE INVENTION

An animal chew product comprising a portion of a dehydrated vegetable, said vegetable selected from a sweet potato and a yam, and method for using and making the product.

Other features and advantages of the present invention will become apparent from the following detailed description taken into conjunction with the accompanying drawings which illustrate by way of example the principles of the invention.

BRIEF DESCRIPTION OF THE SEVERAL VIEWS OF THE DRAWINGS

FIG. 1 is a perspective view of the invention.

FIG. 1A is a perspective view of the invention.

FIG. 2 is a top plane view of the second embodiment of the invention.

DETAILED DESCRIPTION OF THE INVENTION

The invention relates to an animal chew product comprising dehydrated sweet potatoes and yams and methods for making and using these new products Sweet potatoes are an excellent source of vitamin A and a good source of potassium and vitamin C, B6, riboflavin, copper, and pantothentic and folic acids, Although yams are of a different genus, they arm as nutritious as sweet potatoes. The sweet potato and tie yam are not of the same genus as the potato.

The chew product can comprise either a single piece or a plurality of pieces linked together of dehydrated vegetables. Portions of raw vegetables arc dehydrated until they are extremely hard and appear to be without any moisture, thereby providing a hard edible material suitable for canines, birds, rabbits, rats, and other rodents.

In addition, the chew can be made to suit the needs or preferences of the particular animal by selecting larger or smaller sized raw vegetables. Accordingly, the chew can accommodate the preference of a wide variety of animals such as large dogs to small rodents or birds. Moreover, the vegetables may be selected based on their color. Certain sweet potatoes and yams have distinctive colors. These colors are attractive to birds.

Either a raw sweet potato or a raw yam or both are selected. The vegetable is cut cross-wise to form a slice or slices, i.e., cuts are made perpendicular to the longitudinal (length-wise) axis of the vegetable. The slice may range anywhere from approximately one-quarter inch to approximately 4 inches in thickness, depending on the desired thickness and the cross sectional diameter of the raw vegetable selected.

It should be noted, that because of the high sugar content of yams, raw slices made from yams should not exceed approximately ½ inches in thickness. Yam slices exceeding this thickness do not sufficiently hardened after dehydration and will have a gummy or soft consistency.

Depending on the thickness of the slices a substantially cylindrical core 250 is removed so that the raw vegetable slice will dehydrate in one to five days. The removal of the core results in an annular space. i.e., hole 200. Hole 200 ranges from approximately ½ inch to ¾ inch in diameter depending on the selected thickness of the raw slice. Hole 200 extends trough the entire width of the raw slice. For thinner slices, removal of a core maybe omitted, as dehydration will not be impeded.

Figure 3:
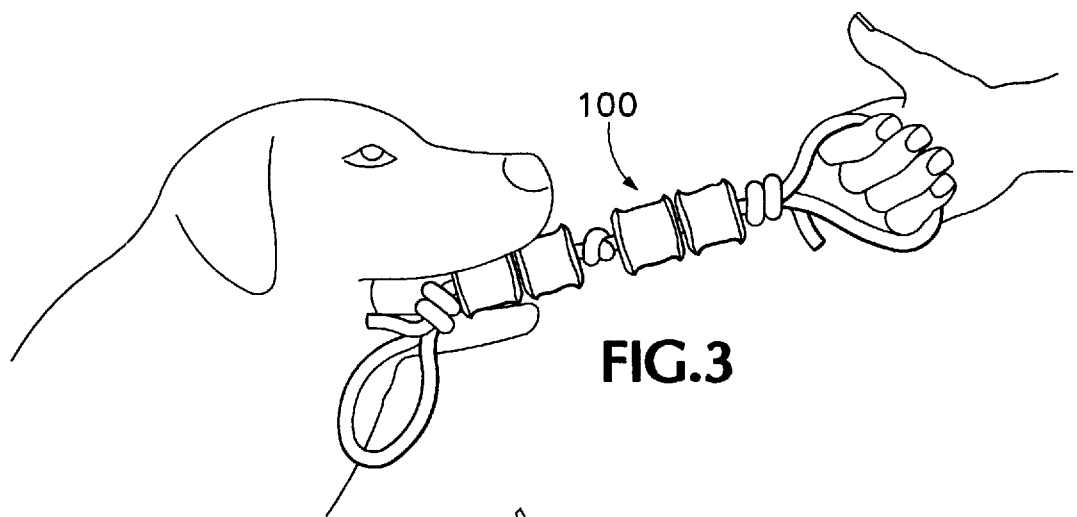
FIG. 3 shows an example of how to use the invention of FIG. 2 with canines.
Figure 4:
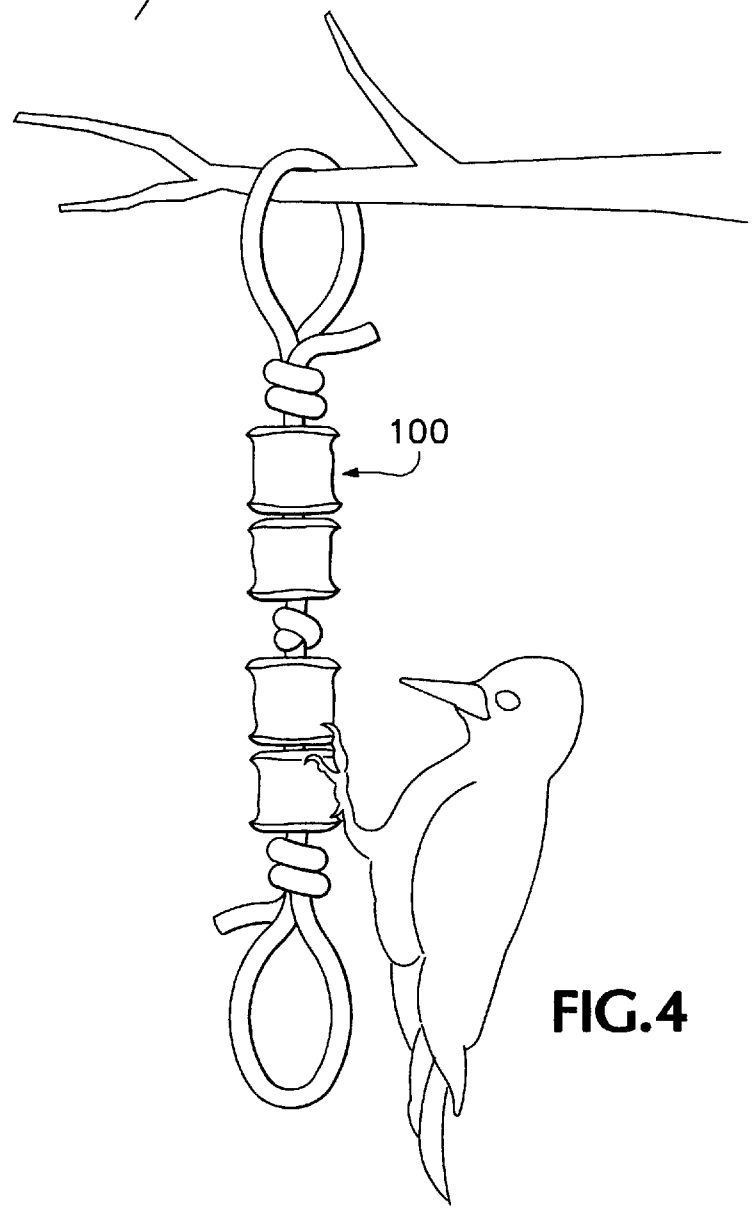
FIG. 4 shows an example of how to use the invention of FIG. 2 with birds.

To make the chew toy of FIGS. 2, 3, and 4, the aforementioned cylindrical core may be removed or a hole may be pierce through the raw slice using a pointed implement. The decision as to which method to employ is dependent on the size of the slice.

Within approximately two hours of rendering the raw vegetables into raw slices or raw slices with an annular space and raw cores 250, the raw vegetable items are dehydrated. Dehydration should start within approximately two to three hours to avoid discoloration and bacterial growth in the raw vegetable items. The dehydrating apparatus may either be an electric dehydrator or one that uses hydrocarbon fuel. Applicant uses an electric dehydrator. The length of time required for dehydration depends on the dimensions of the raw vegetable matter. The raw vegetable items are dehydrated until they are hard and appear dry. The dehydrated vegetable items have a moisture content approximately ranging from seven to 11 percent by weight. The dehydrating apparatus should be housed in an area that provides adequate ventilation so that the moisture generated during the dehydration is vented off.

The resulting dehydrated vegetable items are then allowed to cool to room temperature. The resultant animal chew product may be given to an animal or several of the dehydrated slices 100 can be linked together to form the chew product shown in FIGS. 2, 3, and 4.

As shown in FIG. 2, a plurality of dehydrated slices 100 are arranged and restrained by a connector. The connector, for example, can be cord 400. As shown in FIG. 2, cord 400 is threaded through a plurality of holes 200. Hole 200 is be formed by remove of the aforementioned cylindrical core 250. Where the raw slices ranges from ¼ to ½ inches in thickness, a hole may be pierced through the raw slice with a sharp pointed implement, and cord 400 may then be threaded through the resulting hole. Cord 400 can be selected from synthetic or natural filament.

In addition, an articulating connector can be provided so the chew toy can articulate in a multitude of angles and directions. The articulating connector, for example in FIG. 1, can be cord 400 with knot 430 tied in it. Knot 430 is tied in cord 400 and is sandwiched between two dehydrated slices 100 whereby at least two groups of dehydrated slices 100 are formed, e.g., several dehydrated slices 100 can be threaded onto cord 400 on opposite sides of knot 430. Accordingly, cord 400 can be knotted with either one or several knots 430 resulting in a chew product that can articulate in a multitude of angles and directions. Also, for example, instead of knot 430, cord 400 can be threaded through an annulus and chews 100 can be placed on opposite sides of the annulus. The annulus can be a wooden bead or a dehydrated slice of lesser outer diameter than the slices of the plurality.

The connector may be secured to the slices by a variety of methods. For example, bounded bight 410 in cord 400 can be used. See FIGS. 3 and 4. A sufficient length of cord 400 is allowed to extend out from the first dehydrated slice 100 and the last dehydrated slice 100. Bounded bight 410 is formed with the working portion of cord 400 and secured with knot 420.

Also instead of using knot 420 to form bounded bight 410, bounded bight 410 can be formed by intertwining the separated strands of the distal ends of cord 400 into the standing portion of cord 400, that is, by splicing the distal ends into a standing portion of cord 400. Also, in the case of synthetic fibers, the working portion of the bight can be thermally fused into the standing portion of cord 400 to form bounded bight 410.

Instead of using bounded bight 410, a knot without a bight may be used to secure the connector to the slices. For example, a knot can be knotted in cord 400 at the outer end of the first dehydrated slice and the outer end of the last dehydrated slice.

Also resilient clips can be used to secure dehydrated slices 100 to cord 400. Resilient clips can also form bounded bight 410 by compressing an end portion of cord 400 to a standing portion of cord 400 that is free of dehydrated slices. The resilient clip must provide sufficient compression to ensure that dehydrated slices are secured to cord 400 during use with an animal.

A handle can be provided to allow a human user to grasp the chew product at one end while an animal masticates or plays with remaining portion of the chew product. For example, the handle can be bounded bight 410. The human user grips bounded bight 410 while the animal masticates or plays with the remaining portion of the chew product. See FIG. 3. This provides a chew product that encourages interactive play between humans and animals.

In addition, a hanger can be provided to elevate the chew product. The hanger, for example, as FIG. 4 shows, can be bounded bight 410. Bounded bight 410 is used to secure the chew product in an elevated position so that the chew product can be used with birds.

What is claimed is:

1. An animal chew product for maintaining the oral health of an animal comprising at least one portion of a dehydrated vegetable, said portion selected from a sweet potato and a yam, and a cord arranged to restrain said portion, wherein said portion is secured to said cord.

2. The animal chew product of claim 1, wherein said cord comprises one of a synthetic filament, a natural filament, rope, and hemp.

3. An animal chew product for maintaining the oral health of an animal comprising at least one portion of a dehydrated vegetable, said portion selected from a sweet potato and a yam, and at least one handle, whereby a human user may grasp said animal chew product with said handle while said animal uses its mouth parts to grasp said portion.

4. The animal chew product of claim 3, wherein said handle comprises a bounded bight.

5. An animal chew product for maintaining the oral health of an animal comprising at least one portion of a dehydrated vegetable, said portion selected from a sweet potato and a yam, and at least one hanger, whereby said hanger can be used to secure said animal chew product in an elevated position.

6. The animal chew product of claim 5, wherein said hanger comprises a bounded bight.

7. An animal chew product for maintaining the oral health of an animal comprising:

(a) a plurality of portions of a dehydrated vegetable, said portions selected from a sweet potato and a yam, said portions each having a first end and a second end, wherein said portions are restrained; and (b) an articulating connector arranged to restrain said first end of a first portion proximate said first end of a second portion, whereby said plurality of portions may be arranged and restrained, and whereby said animal chew product can articulate in a multitude of angles and directions.

8. The animal chew product of claim 7, wherein said articulating connector comprises a cord with at least one knot in said cord, said knot being sandwiched between at least two portions.

9. The animal chew product of claim 7, wherein said articulating connector comprises a cord with at least one annulus threaded on said cord, said annulus being sandwiched between at least two portions.

10. A method for making an animal chew product for maintaining the oral health of an animal comprising the acts of:
  (a) selecting at least one raw vegetable from a group consisting of a sweet potato and a yam;
  (b) cutting said raw vegetable into at least one raw portion having a first end and a second end;
  (c) removing a substantially cylindrical core from said raw portion, thereby creating an annular space in said raw portion extending from said first end to said second end;
  (d) dehydrating said raw portion, thereby producing a hard dehydrated portion;
  (e) arranging at least one hard dehydrated portion on a cord;
  (f) restraining said hard dehydrated portion with said cord; and
  (g) securing said cord to said hard dehydrated portion.

11. The method of claim 10, wherein said act of restraining said hard dehydrated portion with said cord comprises threading said hard dehydrated portion on said cord.

12. The method of claim 11, wherein said act of securing said cord to said hard dehydrated portion comprises forming at least one bounded bight with an end segment of said cord.

13. The method of claim 10, wherein said act of securing said cord to said hard dehydrated portion comprises tying at least one knot in said cord proximate the first side of at least one hard dehydrated portion.

14. The method of claim 10, further comprising the act of tying at least one knot in said cord and sandwiching said knot between two hard dehydrated portions.

15. The method of claim 10, further comprising the act of threading said cord through at least one annulus and sandwiching said annulus between at least two hard dehydrated portions.

16. The method of claim 10, further comprising the act of selecting said cord from the group consisting of synthetic filament, natural filament, rope, and hemp.

17. The method of claim 10, further comprising the act of providing at least one handle.

18. The method of claim 17, wherein said act of providing said handle comprises forming a bounded bight with an end segment of said cord.

19. A method for maintaining the oral health of an animal comprising the acts of:
  (a) providing at least one portion of a dehydrated vegetable selected from a group consisting of yam and sweet potato to said animal, wherein said dehydrated portion has a hardness sufficient to clean said animal's mouth parts or exercise said animal's mouth parts;
  (b) arranging said at least one dehydrated portion on a supple connector;
  (c) restraining and securing said portion on said supple connector;
  (d) having a human user grasp a distal end of said connector, and
  (e) permitting said animal to grasp said portion with its mouth parts; whereby said animal may tug and play with said portion in a multitude of angles and directions with its mouth parts while said distal end is retrained by said user.

20. The method of claim 19, further comprising providing at least one handle, whereby said human user may grasp said handle while said animal tugs and plays with said portion.

\* \* \* \* \*